United States Patent [19]

Jacobellis

[11] 4,288,894

[45] Sep. 15, 1981

[54] METHOD OF MANUFACTURING PRESSURE VESSELS BY HEAT FORMING

[75] Inventor: Alfonse A. Jacobellis, Woodland Hills, Calif.

[73] Assignee: Greer Hydraulics, Incorporated, Chatsworth, Calif.

[21] Appl. No.: 78,013

[22] Filed: Sep. 24, 1979

[51] Int. Cl.[3] ...................... B21D 53/00; B21K 29/00; B23P 15/26

[52] U.S. Cl. .................................... 29/157 R; 29/422; 29/454; 138/30

[58] Field of Search ..................... 29/157 R, 422, 454; 138/30

[56] References Cited

U.S. PATENT DOCUMENTS

| | | | |
|---|---|---|---|
| 2,309,181 | 1/1943 | Franck | 29/422 X |
| 2,405,201 | 8/1946 | Franck | 29/422 |
| 2,659,128 | 11/1953 | Baldwin, Jr. et al. | 29/422 |
| 3,195,576 | 7/1965 | Mercier | 138/30 |
| 3,345,725 | 10/1967 | Peters | 29/454 X |
| 4,045,861 | 9/1977 | Zahid | 29/454 |
| 4,077,100 | 3/1978 | Zahid | 29/454 X |
| 4,192,350 | 3/1980 | Mercier | 138/30 |

*Primary Examiner*—Charlie T. Moon
*Attorney, Agent, or Firm*—Arthur B. Colvin

[57] ABSTRACT

The present invention relates to the method of manufacturing a pressure vessel for use as a hydraulic accumulator, pulse dampener or like apparatus employing an elastomeric bladder member, from a cylindrical member which includes the steps of deforming a first end of the member to provide an essentially hemispherical portion having an oil port, installing the elastomeric bladder assembly within said cylindrical member while the other end of said member remains in its essentially cylindrical configuration, and thereafter inwardly deforming the second end of said member while heating the same, said last mentioned heating and deforming steps being carried out while injecting through the last mentioned end a stream of cooling fluid which follows the internal wall portions of the bladder to minimize the possibility of heat damage to the bladder.

6 Claims, 4 Drawing Figures

METHOD OF MANUFACTURING PRESSURE VESSELS BY HEAT FORMING

BACKGROUND OF THE INVENTION

1. Field of the Invention

Figures 1, 2, 3, 4:
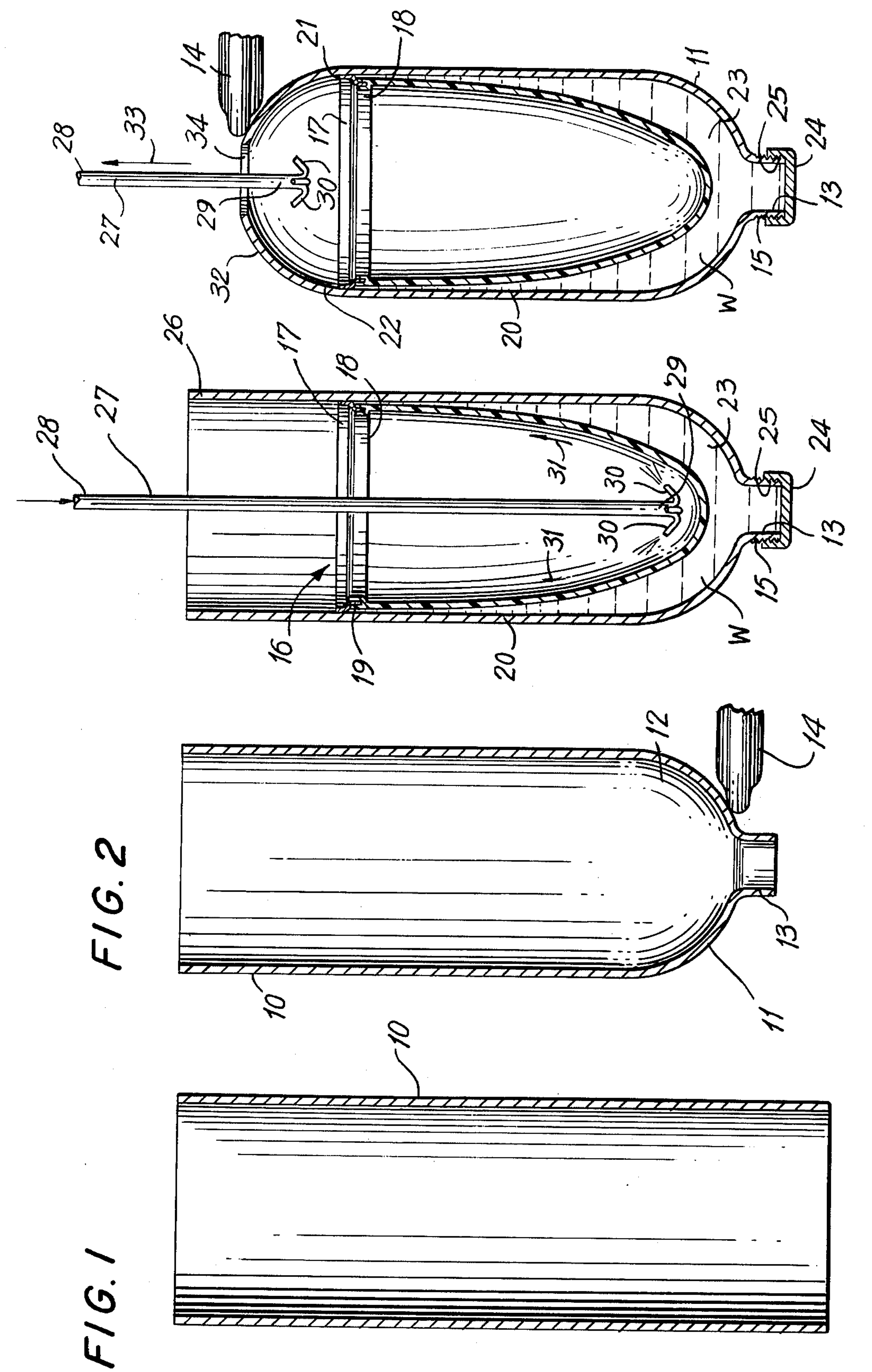

The present invention is in the field of hydraulic accumulators and pulse dampeners and pertains more particularly to a method of making a pressure vessel for an accumulator or pulse dampener device of the type employing an elastomeric bladder by steps which include heat deforming after installation of the bladder.

2. The Prior Art

Accumulators and pulse dampener devices of the type incorporating an elastomeric bladder member dividing the interior of the pressure vessel into two discrete chambers in communication, respectively, with an oil port and a gas charging port, are well known. Numerous methods of making such devices have been practiced.

Specifically, the pressure vessel may be comprised of two preformed half shell members, each member normally including a hemispheric closed end and an open mouth portion.

In accordance with a typical fabrication, the elastomeric bladder member is secured in one shell half and thereafter the mouth portions of the shell halves are secured together to form the pressure vessel. The shell halves may be forged or cast. The operation of forming the shell halves and securing them together is expensive and time consuming.

Attempts have been made to form pressure vessels from cylindrical starting components by hot spinning one end of the cylinder into the desired hemispherical configuration, thereafter emplacing a bladder member supported on a metallic mounting ring at an intermediate position within the partially formed cylinder, and finally hot spinning the remaining open cylindrical end to the desired hemispheric configuration. The ends of the cylinder are typically not closed but, rather, apertures remain which are machined and within which are mounted the oil port assembly and the gas charging valve assembly.

While the formation of pressure vessels by hot spinning steps provides a convenient and inexpensive manufacturing procedure, a high incidence of damage to the bladder member has been experienced at the gas charging end of the vessel during the formation by hot spinning of the hemispherical end in which the gas charging aperture is formed.

SUMMARY

The present invention may be summarized as directed to an improved method of manufacturing a hydraulic accumulator device or pulse dampener from a cylindrical starting blank which includes the steps of heat forming a first end of the blank to a hemispherical configuration, thereafter mounting bladder and metallic retainer ring at an intermediate position within the pressure vessel by welding, and thereafter hot spinning the remaining open end portion of the cylindrical blank to a hemispherical configuration, while minimizing the possibility of damage to the bladder by causing a flow of cooling fluid to follow the configuration of the bladder as the remaining open end is being formed, reducing the likelihood of destructive heat transfer to the bladder.

Preferably, the cooling fluid, which may be a gas such as air under pressure, is caused to flow radially outwardly and in the direction of the end of the cylinder being processed, to impinge upon the inner surface of the bladder by a gas injection apparatus which includes jets directed radially and toward the end being processed.

The method may include the step of progressively withdrawing the gas injection apparatus as a hot spinning step is being performed on the open end of the cylinder.

Accordingly, it is an object of the invention to provide an improved method for forming a hydraulic accumulator device or pulsation dampener.

A further object of the invention is the provision of the method as described which includes the steps of providing a cylindrical blank, hot forming a first end of said blank into the desired hemispherical configuration, positioning a bladder assembly internally of the partially formed blank, weld connecting the retainer ring of the bladder assembly at a desired intermediate position, inducing a flow of cooling gases along the inner surface of the bladder while progressively heating and spinning the said open end to a hemispherical configuration.

The noted steps may include the additional step of introducing into the area between the initially formed end of the blank and the bladder a quantity of water or like liquid for purposes of heat absorption, said last mentioned step being known per se.

To attain these objects and such further objects as may appear herein or be hereinafter pointed out, reference is made to the accompanying drawings, forming a part hereof, in which:

FIGS. 1 to 4 diagrammatically disclose sequential views of the formation of a pressure vessel, the views comprising vertical sections through the vessel at various stages of production.

Turning now to FIG. 1, there is disclosed a cylindrical metal blank member 10 which will be formed into a pressure vessel.

In FIG. 2 a first end portion 11 of the blank 10 has been formed by a hot spinning step, known per se, into an essentially hemispherical end portion 12 having a neck 13. The hot forming step is performed by heating the end 11 to a degree rendering the same malleable while simultaneously rotating the cylinder 10 about its major axis, pressure being progressively applied against the exterior of the cylinder by a spinning tool 14. After the end 11 is formed as noted, the exterior of the neck 13 may be threaded as at 15.

Thereafter a bladder assembly 16 is fixedly mounted within the partially formed cylindrical blank 10. The bladder assembly 16 may include an annular retainer ring 17 having a lower skirt portion 18, to which skirt portion has been bonded the open mouth portion 19 of an elastomeric bladder member 20. As will be understood, the bladder member 20, which may be made of Neoprene or like material, has limited resistance to heat.

The bladder assembly 16 is fixedly positioned at a desired lengthwisely disposed orientation within the blank 10 by an annular fusion weld 21 formed between the retainer ring 17 and an inner wall portion 22 of the blank.

Optionally, to minimize the possibility of damage during the welding step, the space 23 between the bladder 20 and the lower portion 11 of the partially formed cylindrical blank 10 may be filled with water W or a like cooling liquid, the water being retained in position by a cap member 24, internally threaded as at 25, placed over the externally threaded portion 15 of the neck 13.

After attachment of the bladder assembly 16, the other end 26 of the blank 10 is formed to a hemispherical configuration. Desirably the forming step is carried out by a heat spinning of the said end.

The heat spinning step as heretofore attempted to be practiced has often resulted in damaging of the readily heat degraded elastomeric material of the bladder, particularly at the junction of the bladder and the retainer ring 17 and/or the portion of the bladder immediately adjacent the inner walls of the container. Attempts to avoid such damage by merely filling the lower end of the container with water have proven unsuccessful in eliminating a relatively high incidence of damage to the bladder.

In accordance with the method of the present invention, the likelihood of compromising of the bladder has been greatly reduced by introducing a source of cooling fluid such as cooling gases under pressure into the interior of the container through the open end 26 in advance of and during the hot spinning of the said end.

As diagrammatically illustrated, the source of cooling gases may comprise a conduit 27 connected at its outer end 28 to a compressor or the like wherein cooling gases are pumped through the conduit. The lower end 29 of the conduit may include a plurality of radially directed jets 30, 30, the jets preferably being arranged, in addition to their radial orientation, slightly rearwardly toward the end 26.

As will be observed, by virtue of the generally ovate configuration of the bladder 20, the cooling gases impinged against the bladder will be induced to flow upwardly in the direction of the arrows 31, FIG. 3.

The manufacturing steps include a heating and progressive deformation of the upper end 26, as by a spinning tool 14 directed against the rotating blank 10, whereby the upper end 26 is caused to be inwardly deformed to an essentially hemispheric configuration, as shown at 32.

Preferably the cooling gas conduit 27 is progressively withdrawn in the direction of arrow 33 as the spinning tool 14 is directed against portions of the blank more closely adjacent the end 26 of the vessel.

The spinning step is discontinued after the end 26 has been deformed inwardly to define an aperture 34 of a size sufficiently small to permit the mounting therein of the gas charging valve assembly.

As is conventional, the gas charging valve assembly (not shown) may be weldingly connected within the aperture 34 or, alternatively, the aperture may be tapped and the valve threadedly engaged therein.

In use, the cap member 24 is removed and the cooling liquid W drained, following which an oil port assembly (not shown) is mounted in the neck 13.

As will be evident from the foregoing description, the method in accordance with the present invention provides for the fabrication of a hydraulic accumulator, pulsation dampener or like device incorporating a bladder, dividing the vessel into two discrete chambers in a manner which minimizes the possibility of damage to the bladder, while nonetheless enabling the hemispherical end portions of the vessel to be formed by a hot spinning step.

The procedure is, in a measure, particularly effective in view of the configuration of the bladder whereby cooling gases introduced at the base of the bladder are caused to follow the configuration of the bladder, whereby the cooling gases are most effectively directed against the portions of the bladder wherein damage is most likely to be experienced.

While the method has been described in a sequence in which the cooling gases are introduced after a fusion weld between the bladder retainer ring and the inner wall of the pressure vessel has been effected, the cooling gas flow may advantageously be instituted prior to formation of the annular fusion weld.

As will be understood by the skilled workers in the art familiarized with the instant disclosure, further variations on the defined steps may be made without departing from the spirit of the present invention. Accordingly, the invention is to be broadly construed within the scope of the appended claims.

Having thus described the invention and illustrated its use, what is claimed as new and is desired to be secured by Letters Patent is:

1. The method of manufacturing a pressure vessel for use as a hydraulic accumulator which comprises the steps of providing a cylindrical metal member, inwardly deforming a first end of said member to define a generally hemispherical portion having a central oil port, providing a bladder assembly including a metallic retainer ring carrying a resilient, distensible elastomeric bladder member, inserting said bladder assembly into the interior of said metal member through the other end of said member and advancing said retainer ring to an intemediate position within said member, weldingly connecting said retainer ring to inner wall portions of said member about a circumferential weld line to divide said member into two chambers separated by said bladder assembly, introducing a source of cooling fluid into said chamber through said other end to induce an outward gaseous flow originating at a point adjacent said bladder and directed radially outwardly in directions conforming to the configuration of said bladder, while simultaneously heating and inwardly deforming the wall adjacent said other end of said cylindrical metal member at positions progressively nearer said other end while maintaining said cooling fluid flow, to cause said wall to assume a generally hemispherical configuration and reduce the diameter of said other end to define a central gas port, and thereafter withdrawing said source of cooling fluid through said central port.

2. The method in accordance with claim 1 wherein said cooling fluid flow is directed toward said other end in addition to said radial outward direction.

3. The method in accordance with claim 1 wherein said source of cooling fluid is progressively shifted closer to said other end as portions of said wall nearer said other end are progressively heated and deformed.

4. The method in accordance with claim 1 and including the step of at least partially filling the chamber between said bladder assembly and said oil port with a cooling liquid.

5. The method in accordance with claim 1 wherein said source comprises a plurality of jets, said jets being directed radially and inclined in the direction of said other end.

6. The method in accordance with claim 5 wherein said step of deforming said wall adjacent said other end comprises a spinning step.

* * * * *